Oct. 9, 1962     G. KLEMT ET AL     3,057,257
HIGH-SPEED PHOTOGRAPHIC OR CINEMATOGRAPHIC VARIFOCAL OBJECTIVE
Filed Feb. 11, 1960
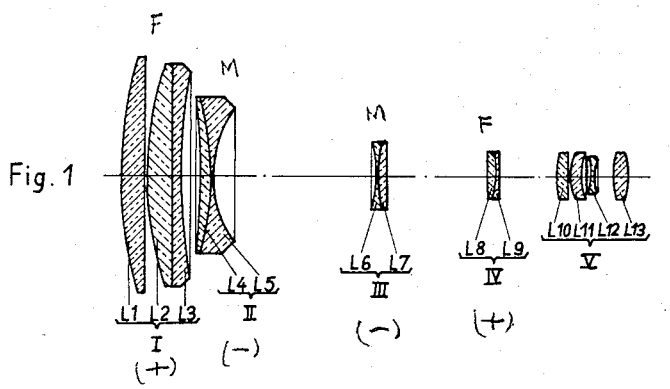
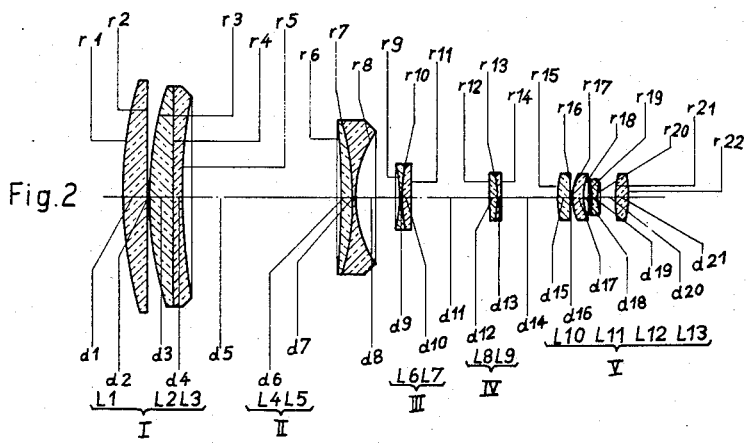
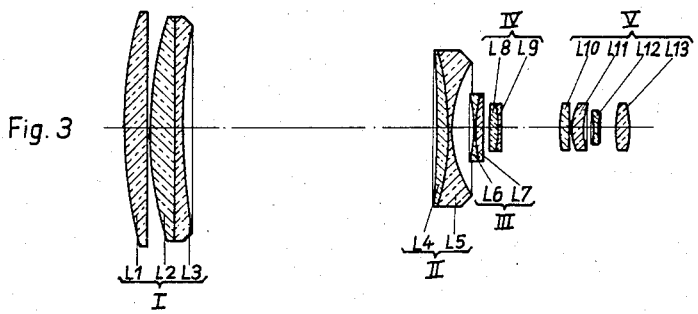
INVENTORS:
Günter KLEMT
Karl MACHER
By Karl J. Ross
Agent

United States Patent Office

3,057,257
Patented Oct. 9, 1962

3,057,257
HIGH-SPEED PHOTOGRAPHIC OR CINEMATOGRAPHIC VARIFOCAL OBJECTIVE
Günter Klemt and Karl Macher, Kreuznach, Rhineland, Germany, assignors to Jos. Schneider & Co., Optische Werke, Kreuznach, Rhineland, Germany, a corporation of Germany
Filed Feb. 11, 1960, Ser. No. 8,069
Claims priority, application Germany Feb. 17, 1959
2 Claims. (Cl. 88—57)

Our present invention relates to varifocal objectives for photographic or cinematographic cameras.

It is known to assemble a varifocal objective system from a principal or basic objective of fixed focal length and an associated front attachment whose focal length is adjustable. Such attachments advantageously include a fixed front component on the object side of the system, a fixed rear component on the image side of the system, i.e. next to the basic objective, and one or more movable components between the two fixed components. Varifocal attachments of this general description have the advantage of a constant physical length and afford greater convenience in the mounting of the movable lens supports since only the smaller intermediate component or components need to be displaced, the large front component remaining stationary. With two negatively refracting movable components between two fixed outer components of positive refractivity, the displacement of these movable components can be made to approach a linear function of the adjustable focal length so that the need for a complex control mechanism, involving cams or the like, is eliminated.

The general object of our present invention is to provide a varifocal system of this character in which the various aberrations inherent in such systems are reduced to a minimum.

More specifically, it is an object of this invention to provide a varifocal system in which the residual aberrations are substantially constant throughout the range of adjustment so that compensation thereof in the design of the basic objective becomes possible.

In accordance with the present invention we realize the above objects by making the focal length of the fixed positive rear component equal to or less than 75% of the focal length of the fixed positive front component while making the focal length of the more rearward movable negative component larger by at least 10% than that of the more forward movable negative component. Advantageously, in order to reduce the total axial dimension of the system, we make the focal length of the aforementioned positive rear component larger than the sum of the three air spaces separating the two movable components from each other and from the two positive components, this sum remaining of course constant under all conditions of operation.

In a preferred embodiment, in which the fixed front component consists of two air-spaced lens members of which the second one as well as each of the other three components may be cemented, we design the two movable components in such manner that respective concave outer surfaces thereof, more strongly curved than their other surfaces, face each other across the intervening variable air space. The radii of curvatiure of the other surfaces (including the cemented ones) of these movable components are preferably considerably larger than those of the two concave surfaces referred to.

The invention will be described in greater detail with reference to the accompanying drawing in which:

FIG. 1 shows a varifocal system according to the invention in a position of adjustment for minimum focal length ($f=50$);

FIG. 2 shows the same system in a position of adjustment for an intermediate focal length ($f=100$); and FIG. 3 shows the system adjusted to maximum focal length ($f=200$).

The system shown in the drawing comprises a varifocal attachment, consisting of four components I–IV, and a fixed principal or basic objective designated component V. The fixed front component I, of positive refractivity, consists of a nearly plano-convex singlet $L_1$ (radii $r_1$, $r_2$ and thickness $d_1$ and, separated from it by a small air space $d_2$, of a doublet composed of a positive lens $L_2$ (radii $r_3$, $r_4$ and thickness $d_3$) and a negative lens $L_3$ (radii $r_4$, $r_5$ and thickness $d_4$). A variable air space $d_5$ separates front component I from the first intermediate component II, of negative refractivity, which consists of a positive lens $L_4$ (radii $r_6$, $r_7$ and thickness $d_6$) and a negative lens $L_5$ (radii $r_7$, $r_8$ and thickness $d_7$). Another variable air space $d_8$ marks the distance of the vertex of the more strongly concave surface ($r_8$) of component II from the corresponding surface ($r_9$) of the second intermediate, negatively refracting component III which consists of a negative lens $L_6$ (radii $r_9$, $r_{10}$ and thickness $d_9$) and a positive lens $L_7$ (radii $r_{10}$, $r_{11}$ and thickness $d_{10}$). Component III is separated by a variable air space $d_{11}$ from the fixed positively refracting rear component IV which consists of a positive lens $L_8$ (radii $r_{12}$, $r_{13}$ and thickness $d_{12}$) and a negative lens $L_9$ (radii $r_{13}$, $r_{14}$ and thickness $d_{13}$).

The two intermediate components II and III are displaceable between their extreme positions, illustrated in FIGS. 1 and 3, to change the focal length of the attachment I–IV and, therefore, of the overall objective system I–V. It will be understood that this change in focal length will be accompanied by only negligible shifts in backfocal distance so that the position of the image plane of the system, coinciding with the surface of a film or other photosensitive element, will remain substantially unchanged.

The unit I–IV is separated by an air space $d_{14}$ from the basic objective, component V, consisting of four airspaced singlets $L_{10}$–$L_{13}$. Biconvex lens $L_{10}$, having radii $r_{15}$, $r_{16}$ and thickness $d_{15}$, is spaced by a small distance $d_{16}$ from positive meniscus $L_{11}$ having radii $r_{17}$, $r_{18}$ and thickness $d_{17}$; there follows, beyond an air space $d_{18}$, the biconcave lens $L_{12}$ with radii $r_{19}$, $r_{20}$ and thickness $d_{19}$, the final air space $d_{20}$ separating this lens from the biconvex lens $L_{13}$ with radii $r_{21}$, $r_{22}$ and thickness $d_{21}$.

Representative numerical values for the radii $r_1$ to $r_{22}$ and the thicknesses and separations $d_1$ to $d_{21}$ of lenses $L_1$ to $L_{13}$ will be given in the following table, based upon the median overall focal length $f=100$ of the system adjusted as in FIG. 2; the values listed for the variable air spaces $d_5$, $d_8$ and $d_{11}$ refer also to the position of FIG. 2. The table further gives the refractive indices $n_d$ and the Abbé numbers $v$ of these lenses along with the total physical length $d_{total}$ of the system and the individual focal lengths $f_1$, $f_2$, $f_3$, $f_4$ and $f_5$ of the components I–V.

| Lens | Radii | Thicknesses and air spacings | $n_d$ | $\nu$ |
|---|---|---|---|---|
| I $f_1=+424.0$ { $L_1$ | $r_1 = +\ 342.55$ | $d_1 = 20.00$ | 1.52542 | 64.55 |
|  | $r_2 = -2,255.00$ | $d_2 = 0.40$ | Air space |  |
| $L_2$ | $r_3 = +\ 287.20$ | $d_3 = 19.35$ | 1.62041 | 60.29 |
|  | $r_4 = -4,232.50$ | $d_4 = 5.85$ | 1.76182 | 26.52 |
| $L_3$ | $r_5 = +\ 470.75$ | $d_5 = 124.25$ | ¹ Air space |  |
| II $f_2=-191.0$ { $L_4$ | $r_6 = -\ 850.50$ | $d_6 = 10.25$ | 1.75520 | 27.53 |
|  | $r_7 = -\ 231.95$ | $d_7 = 3.10$ | 1.50378 | 66.73 |
| $L_5$ | $r_8 = +\ 93.15$ | $d_8 = 34.10$ | ¹ Air space |  |
| III $f_3=-219.0$ { $L_6$ | $r_9 = -\ 118.15$ | $d_9 = 2.95$ | 1.50378 | 66.73 |
|  | $r_{10} = +\ 141.25$ | $d_{10} = 7.30$ | 1.75520 | 27.53 |
| $L_7$ | $r_{11} = +\ 366.15$ | $d_{11} = 64.70$ | ¹ Air space |  |
| IV $f_4=+242.0$ { $L_8$ | $r_{12} = +\ 307.65$ | $d_{12} = 6.85$ | 1.62041 | 60.29 |
|  | $r_{13} = -\ 104.15$ | $d_{13} = 3.40$ | 1.62004 | 36.34 |
| $L_9$ | $r_{14} = -\ 290.95$ | $d_{14} = 45.00$ | Air space |  |
| V $f_5=+91.34$ { $L_{10}$ | $r_{15} = +\ 64.95$ | $d_{15} = 10.20$ | 1.62041 | 60.29 |
|  | $r_{16} = -1,050.00$ | $d_{16} = 0.15$ | Air space |  |
| $L_{11}$ | $r_{17} = +\ 38.93$ | $d_{17} = 10.10$ | 1.62041 | 60.29 |
|  | $r_{18} = +\ 49.55$ | $d_{18} = 6.80$ | Air space |  |
| $L_{12}$ | $r_{19} = -\ 129.90$ | $d_{19} = 2.85$ | 1.69895 | 30.05 |
|  | $r_{20} = +\ 33.20$ | $d_{20} = 13.75$ | Air space |  |
| $L_{13}$ | $r_{21} = +\ 93.40$ | $d_{21} = 10.85$ | 1.65830 | 57.29 |
|  | $r_{22} = -\ 53.15$ |  |  |  |
|  |  | $d_{total} = 402.20$ |  |  |

¹ Variable.

As will be seen from the foregoing table, the constant sum of the three variable air spaces $d_5$, $d_8$ and $d_{11}$ equals 223.05, being thus less than the focal length $f_4$ which in turn is less than 75% of the focal length $f_1$. Focal length $f_3$ exceeds focal length $f_2$ by more than 10%.

The objective system represented by the table has an aperture ratio of 1:2.8 and a varifocal ratio of substantially 1:4 as given by the minimum focal length $f=50$ (FIG. 1) and the maximum focal length $f=200$ (FIG. 3).

We claim:

1. A varifocal attachment for an optical objective, consisting of four components separated from one another by variable air spaces, said components including a fixed front component of positive refractivity, a first movable intermediate component of negative refractivity, a second movable intermediate component of negative refractivity and a fixed rear component of positive refractivity, said rear component having a focal length equal to at most 75% of the focal length of said front component, said second intermediate component having a focal length exceeding by at least 10% the focal length of said first intermediate component, the sum of said air spaces being less than the focal length of said rear component, the absolute values of the focal lengths of said front, first intermediate, second intermediate and rear components being related to one another substantially in the proportions 424:191:219:242, the radii $r_1$ to $r_{14}$ and the thicknesses and separations $d_1$ to $d_{13}$ of the lenses $L_1$ to $L_9$ forming part of said front component I, said first intermediate component II, said second intermediate component III and said rear component IV, their indices of refraction $n_d$ and their Abbé numbers $\nu$ having numerical values substantially as given in the following table:

| Lens | Radii | Thicknesses and air spacings | $n_d$ | $\nu$ |
|---|---|---|---|---|
| I { $L_1$ | $r_1 = +\ 342.55$ | $d_1 = 20.00$ | 1.52542 | 64.55 |
|  | $r_2 = -2,255.00$ | $d_2 = 0.40$ | Air space |  |
| $L_2$ | $r_3 = +\ 287.20$ | $d_3 = 19.35$ | 1.62041 | 60.29 |
|  | $r_4 = -4,232.50$ | $d_4 = 5.85$ | 1.76182 | 26.52 |
| $L_3$ | $r_5 = +\ 470.75$ | $d_5 = 124.25$ | ¹ Air space |  |
| II { $L_4$ | $r_6 = -\ 850.50$ | $d_6 = 10.25$ | 1.75520 | 27.53 |
|  | $r_7 = -\ 231.95$ | $d_7 = 3.10$ | 1.50378 | 66.73 |
| $L_5$ | $r_8 = +\ 93.15$ | $d_8 = 34.10$ | ¹ Air space |  |
| III { $L_6$ | $r_9 = -\ 118.15$ | $d_9 = 2.95$ | 1.50378 | 66.73 |
|  | $r_{10} = +\ 141.25$ | $d_{10} = 7.30$ | 1.75520 | 27.53 |
| $L_7$ | $r_{11} = +\ 366.15$ | $d_{11} = 64.70$ | ¹ Air space |  |
| IV { $L_8$ | $r_{12} = +\ 307.65$ | $d_{12} = 6.85$ | 1.62041 | 60.29 |
|  | $r_{13} = -\ 104.15$ | $d_{13} = 3.40$ | 1.62004 | 36.34 |
| $L_9$ | $r_{14} = -\ 290.95$ |  |  |  |

¹ Variable.

2. The combination of an attachment according to claim 1 with a basic objective consisting of four air-spaced singlets $L_{10}$ to $L_{13}$ whose radii $r_{15}$ to $r_{22}$, thicknesses and separations $d_{15}$ to $d_{21}$, indexes of refraction $n_d$ and Abbé numbers $\nu$, together with the air space $d_{11}$ between said attachment and said basic objective, have numerical values substantially as given in the following table:

| Lens | Radii | Thicknesses and air spacings | $n_d$ | $\nu$ |
|---|---|---|---|---|
|  |  | $d_{14} = 45.00$ | Air space |  |
| $L_{10}$ | $r_{15} = +\ 64.95$ | $d_{15} = 10.20$ | 1.62041 | 60.29 |
|  | $r_{16} = -1,050.00$ | $d_{16} = 0.15$ | Air space |  |
| $L_{11}$ | $r_{17} = +\ 38.93$ | $d_{17} = 10.10$ | 1.62041 | 60.29 |
|  | $r_{18} = +\ 49.55$ | $d_{18} = 6.80$ | Air space |  |
| $L_{12}$ | $r_{19} = -\ 129.90$ | $d_{19} = 2.85$ | 1.69895 | 30.05 |
|  | $r_{20} = +\ 33.20$ | $d_{20} = 13.75$ | Air space |  |
| $L_{13}$ | $r_{21} = +\ 93.40$ | $d_{21} = 10.85$ | 1.65830 | 57.29 |
|  | $r_{22} = -\ 53.15$ |  |  |  |

References Cited in the file of this patent

UNITED STATES PATENTS

| 2,514,239 | Hopkins | June 4, 1950 |
| 2,746,350 | Hopkins | May 22, 1956 |
| 2,844,996 | Klempt | July 29, 1958 |
| 2,847,907 | Angenieux | Aug. 19, 1958 |